April 24, 1962     J. J. CHRISTENSON ET AL     3,031,203

WHEELED VEHICLE SUPPORTING MECHANISM

Original Filed Jan. 2, 1958

JAMES JULIUS CHRISTENSON,
FREDERICK G. MALONEY,
INVENTORS.

WHANN & McMANIGAL
Attorneys for Applicant by Robert M. McManigal 3,031,203
WHEELED VEHICLE SUPPORTING MECHANISM
James Julius Christenson, Cowiche, and Frederick G. Maloney, Yakima, Wash.; said Maloney assignor, by mesne assignments, to Towmotor Corporation, Cleveland, Ohio, a corporation of Ohio
Original application Jan. 2, 1958, Ser. No. 706,803, now Patent No. 2,862,635, dated Dec. 2, 1958. Divided and this application Sept. 29, 1958, Ser. No. 763,916
4 Claims. (Cl. 280—104.5)

The present invention relates generally to wheeled vehicles, and is more particularly concerned with improved mechanism for supporting the vehicle body and its load with respect to a road surface.

The present invention constitutes a division of our copending application covering a Straddle Carrier, Serial No. 706,803, filed January 2, 1958, now Patent No. 2,862,635.

It is one object of the invention to provide a unique resilient suspension for tandem connected vehicle wheels.

Further objects and advantages of the invention may be brought out in the following part of the specification wherein some small details have been described for the purpose of providing a complete and easily understood disclosure without, however, intending to limit the scope of the invention which is defined by the accompanying claims.

Referring to the accompanying drawings which are for illustrative purposes only:

Figure 1:
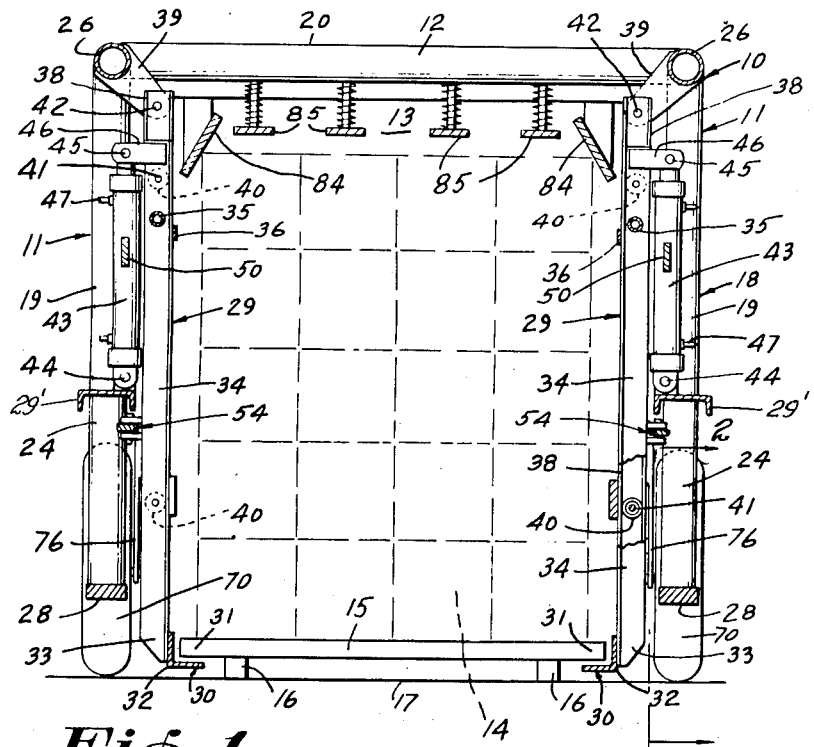
FIG. 1 is an enlarged fragmentary sectional view of a wheeled vehicle embodying the present invention.

For purposes of illustration the invention is illustrated as being embodied in a vehicle, such as a trailer, in which the body of the trailer is referred to as a frame 10. Although of open work construction, the frame 10, as shown in FIG. 1 comprises parallel vertical side walls 11 and a horizontal top wall 12 defining a longitudinally elongated chamber 13 open along its bottom and at its rear end, so that the trailer may be backed into a position to surround or enclose a load shown in FIG. 2 as consisting of a pile of boxes 14 stacked on pallets 15 which are supported on longitudinal stringers 16 resting upon a road surface or floor 17 which may be the ground in an orchard.

The frame 10 includes a main arch 18 consisting of a pair of heavy posts 19 made of steel pipes of comparatively large diameter, and a horizontal cross member 20 consisting of a pipe of substantially the same diameter as the post 19, the ends of the cross member 20 being welded to the upper ends of the posts 19 so that a strong arch is formed. The posts 19 are included in the side walls 11 of the frame 10 and the cross member 20 is included in the top wall 12.

The side walls 11 also include a bottom beam 28 which is spaced above the ground as shown in FIG. 1 and is welded to the lower ends of vertical studs such as shown at 24 being spaced along said wall. Also, each side wall 11 includes a girt or intermediate horizontal beam 29', disposed between the upper and lower beams 26 and 28, extending full length of the frame 10, and being welded to the posts 19 and to said vertical studs 21 through 25.

Figure 2:
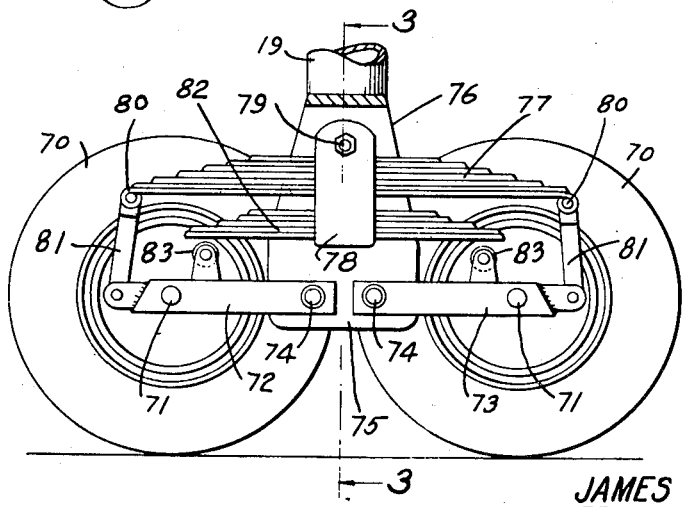
FIG. 2 is an enlarged fragmentary sectional view taken as indicated by the line 2—2 of FIG. 1, showing one set of wheels and supports therefor according to the invention.
Figure 3:
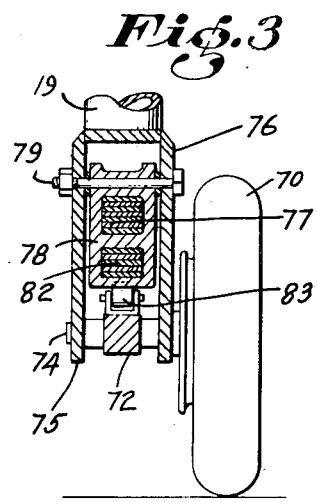
FIG. 3 is a sectional view taken as indicated by the line 3—3 of FIG. 2.

Although not to be considered a part of the present invention, being referred to herein to indicate more clearly the purpose and intended function of the device of the present invention, lifters as indicated at 29 are provided for lifting the load 14 from the position in which it is shown in FIG. 2, to elevate the pallets 15 supporting the same sufficiently off the ground or floor 17 to permit the vehicle to be rolled away to carry the load to a selected destination. The lifters 29 include shelves 30 adapted to be moved into positions under the edges 31 of the pallets 15. These shelves 30 are the horizontally directed flanges of structural angles 32 which extend longitudinally along the frame 10 being connected to vertical bars 34.

For effecting vertical movement of the lifters 29, pairs of hydraulic jack motors 43 are arranged vertically in the side walls 11, with their lower ends connected by hinge elements 44 to the upper faces of the girts 29' and with their upper ends connected by hinge pins 45 to brackets 46 which extend outwardly from the upper ends of said vertical bars 34. These jack motors 43 each consist of a cylinder and double acting piston, the cylinders being provided with hydraulic connections 47 adapted for connection to the hydraulic hoses, not shown, of a hydraulic system for operation of the hydraulic parts of the device.

Tandem wheels 70, for supporting the frame 10, are connected to the lower ends of the posts 19 which, as shown in FIG. 1, cooperate with the transverse beam member 20 in forming a rigid arch for supporting the rearward portion of the frame 10. As shown in FIGS. 4 and 5, the wheels 70 are supported on axles 71 which extend horizontally from the ends of forwardly and rearwardly extending lever arms 72 and 73 which are swingable vertically on horizontal hinge pins 74 supported by the plates 75 of a depending bracket 76 which is welded onto the lower end of the associated posts 19. A main leaf spring member 77 has its central portion connected by a block 78 to a horizontal pin 79 mounted in the bracket 76, so that the hinge 80 of the spring member 77 may swing up and down around the axis of the pin 79. The ends 80 of the spring member 77 are connected by approximately vertical links 81 with the swingable ends of the lever arms 72 and 73 so that the load from the wheels 70 will thereby be transmitted to the main spring member 77 during normal conditions of road operation. An overload leaf spring 82 is disposed below the main spring member 77 and has its central portion supported by the block 78.

Bumper rollers 83 are mounted near the ends of the lever arms 72 and 73 for engagement with the end portions of the overload spring member 82 when overload conditions of operation are encountered. Except for their inner connections through the spring 77 the wheel axles 71 are independently vertically swingable by encountered road conditions and, therefore, a minimum of road shock and vertical movement are transmitted from the wheels 70 to the frame 10 and the load carried thereby.

For stabilizing the upper part of the load 14 when it is raised within the chamber 13, longitudinal strips 84 and 85 are supported in the top of the chamber 13. The strips 85 are supported so that they may yield upwardly when engaged by the rising load, and the strips 84 are disposed in diagonal planes, shown in FIG. 2, show that the corner portions of the load will be engaged thereby and restrained from lateral movement.

Having thus described one embodiment of wheeled vehicle supporting mechanism it will be realized that it is susceptible to various combinations, modifications and arrangements of parts without departing from the inventive concepts thereof as are defined in the claims.

We claim:
1. In a wheeled vehicle, a load carrying frame structure, a plurality of wheeled supporting assemblies for said frame, each of said assemblies comprising a depending bracket carried by said frame structure, arms extending respectively forwardly and rearwardly from said bracket, hinge means connecting said arms at their innermost ends to said bracket so that the outermost ends thereof may swing upwardly and downwardly, wheels respectively supported at the outermost ends of said arms for rotation, said wheels having tandem relation, a main leaf spring supported by said bracket positioned above said arms, links respectively connecting the ends of said spring means to said arms so that said spring means will resist upward movement of said wheels relative to said frame, and an overload leaf spring supported by said bracket normally disengaged with respect to said arms, but engaged thereby upon predetermined movement of said arms in a direction against said main spring.

2. In a wheeled vehicle having a load carrying frame structure, at least one wheeled supporting assembly, comprising: a depending bracket on said frame structure, arms extending respectively forwardly and rearwardly from said bracket, hinge means connecting the innermost ends of said arms to said bracket so that their outer ends may have up and down swinging movements, a block positioned above said hinge means connected to said bracket for swinging movement, main leaf spring means and overload leaf spring means supported in said block with their opposite ends respectively positioned above the outer ends of said arms, links connecting the outer ends of said main leaf spring means with the outer ends of said arms, and abutment bumpers carried by said arms adapted to engage the outer ends of the overload leaf spring means upon predetermined upward swinging movement of the outer ends of said arms.

3. In a wheeled vehicle having a load carrying frame structure, at least one wheeled supporting assembly, comprising: a depending bracket on said frame structure, arms extending respectively forwardly and rearwardly from said bracket, hinge means connecting the innermost ends of said arms to said bracket so that their outer ends may have up and down swinging movements, a block positioned above said hinge means connected to said bracket for swinging movement, main leaf spring means and overload leaf spring means supported in said block with their opposite ends respectively positioned above the outer ends of said arms, said main spring means being of greater length than said overload spring means, links connecting the outer ends of said main spring means with the outer ends of said arms, and abutment bumpers carried by said arms adapted to engage the outer ends of the overload leaf spring means upon predetermined upward swinging movement of the outer ends of said arms.

4. In a wheeled vehicle having a load carrying frame structure, at least one wheeled supporting assembly, comprising: a fixed inverted U-shaped bracket depending from said frame structure, and having spaced side walls connected by a bridging portion; arms extending respectively forwardly and rearwardly from said bracket with their innermost ends positioned between the outer ends of the bracket side walls; pivot means at spaced points for the innermost ends of said arms connecting the arms to the bracket for upwardly and downwardly swinging movements of the outermost ends of the arms; wheels in tandem relation rotatably supported adjacent the outermost ends of said arms, each of said wheels being swingable as a unit with its associated arm; a block positioned adjacent the bridging portion of the bracket and supported from the side walls thereof for swinging movement; main leaf spring means supported in said block with its opposite ends respectively positioned above the outer ends of said arms; links connecting the outer ends of the main spring means with the outer ends of said arms; supplementary leaf spring means mounted in said block below the main leaf spring means, and being of shorter length than the main leaf spring means; and projections respectively carried by said arms adapted to engage the outer end of the supplementary leaf spring means upon predetermined upward swinging movement of the arm under overload conditions.

References Cited in the file of this patent
UNITED STATES PATENTS

| | | |
|---|---|---|
| 1,318,819 | Ten Broeck et al. | Oct. 14, 1919 |
| 1,546,144 | Mills | July 14, 1925 |
| 1,679,050 | Newman | July 31, 1928 |
| 1,767,750 | Fisher | June 24, 1930 |
| 2,108,323 | Weiss | Feb. 15, 1938 |
| 2,595,474 | Marvin | May 6, 1952 |
| 2,654,615 | Francis | Oct. 6, 1953 |
| 2,698,758 | Ronning | Jan. 4, 1955 |
| 2,734,755 | Van Raden | Feb. 14, 1956 |
| 2,756,068 | Poirier | July 24, 1956 |

UNITED STATES PATENT OFFICE
CERTIFICATE OF CORRECTION

Patent No. 3,031,203                                                       April 24, 1962

James Julius Christenson et al.

It is hereby certified that error appears in the above numbered patent requiring correction and that the said Letters Patent should read as corrected below.

In the grant, lines 2 to 4, for "said Maloney assignor, by mesne assignments, to Towmotor Corporation, of Cleveland, Ohio, a corporation of Ohio," read -- assignors, by direct and mesne assignments, to Towmotor Corporation, of Cleveland, Ohio, a corporation of Ohio, --; lines 13 and 14, for "James Julius Christenson, his heirs or assigns, and Towmotor Corporation, its successors" read -- Towmotor Corporation, its successors --; in the heading to the printed specification, lines 4 to 6, for "said Maloney assignor, by mesne assignments, to Towmotor Corporation, Cleveland, Ohio, a corporation of Ohio" read -- assignors, by direct and mesne assignments, to Towmotor Corporation, Cleveland, Ohio, a corporation of Ohio --.

Signed and sealed this 26th day of April 1966.

(SEAL)
Attest:

ERNEST W. SWIDER
Attesting Officer

EDWARD J. BRENNER
Commissioner of Patents